Reissued Apr. 8, 1947

Re. 22,865

UNITED STATES PATENT OFFICE 22,865

PROCESS OF MAKING A FOOD PRODUCT

Daniel Boscawen Vincent, Tampa, Fla.

No Drawing. Original No. 2,215,944, dated September 24, 1940. Serial No. 250,652, January 12, 1939. Application for reissue August 5, 1946, Serial No. 688,397

14 Claims. (Cl. 99—2)

This invention relates to foods and the process of making the same from citrus fruit waste such as the peel, rag and seed of citrus fruits. It is therefore an object of this invention to prepare a product from citrus fruit peel and/or rag and/or seed which is suitable as a foodstuff for humans and as a cattle feed.

A further object of my invention is to prepare a new and valuable food product from cull citrus fruit and by-products comprising peel, rag and seed discarded by citrus fruit canneries.

Another object is to provide a process for the removal of water and objectionable taste from these citrus materials economically and efficiently.

A further object is to provide a continuous process for producing stock food having the desired feeding properties from citrus fruit materials without expensive equipment or extensive technical control.

A further object is to chemically treat citrus materials to expedite the removal of water therefrom and to eliminate objectionable odors and tastes from the finished food product.

It is therefore an object of this invention chemically to treat citrus wastes and remove a controlled amount of water together with the constituents causing objectionable odor and taste, thus producing a new palatable foodstuff of delightful fruit odor and taste and possessed of unusual nutritive qualities.

In the canning of grapefruit hearts and grapefruit or orange juice there results by-products consisting of peel, rag, seed, residual juice and sometimes considerable quantities of water. The normal waste is slick and contains 80% to 85% moisture but may contain as high as 95% and under the prior art practice it is not adaptable to commercial processing. Consequently the citrus wastes have been discarded but even the disposal has been diagreeable, expensive, and difficult.

Various methods have been suggested for the utilization of this waste material but none has proven economical or efficient. For example, attempts have been made to use the green, i. e., unprocessed, citrus wastes as a fertilizer. Citrus fruit refuse, however, is low in plant food content and high in water content. The water very slowly is released to the soil and air as the solids undergo decomposition with an offensive odor. The decomposition constitutes a health hazard in providing an attraction and a suitable environment for the propagation of flies, gnats, and the like. Even when the wastes will have disintegrated there will be but little or no benefit to the land.

Efforts have also been made to convert citrus refuse into a feed for cattle. One practice in the past has been to grind the green untreated citrus wastes and ship the material with its high water content to dairies to be used as feed. This procedure, however, is unsatisfactory from both the cost and feeding standpoints. The large amount of water that must be transported results in excessive transportation costs and further, the green, unprocessed citrus waste decomposes rapidly. Even when the unprocessed fresh citrus wastes are fed to dairy cattle near the cannery and thus eliminating or reducing the transportation costs, there is a more serious objection. When the unprocessed citrus wastes are fed to dairy cattle, the milk has a very disagreeable flavor due to the essential oil and bitter flavor content, for example, naringin, of the citrus material. Likewise, it has been found that this disagreeable flavor is present in the meat of beef cattle fed on unprocessed citrus wastes. Under my invention, however, the green or dry chemically treated citrus materials may be fed to great advantage without flavoring the milk or meat.

In the prior art processes where the citrus peel, rag and seed have been ground, shredded, or crushed, the water cannot be removed economically from the unprocessed pulp. Many efforts have been made to press or mechanically dewater the citrus wastes so that it may be more readily dried or handled green as a feed. It has been found, however, that the only moisture successfully extracted has been the free water and juices of the fruit that may be contained in the waste material from the canneries. Therefore, during the subsequent drying operation, the moisture and acids not removed mechanically react with other constituents forming undesirable intermediate products which retard the water removal. The presence of these rubbery, gummy substances prevents rapid drying of the material and greatly increases the cost of drying.

This invention provides a process wherein these difficulties are overcome by chemically treating the cannery wastes before the pressing and drying steps. The chemical treatment of the citrus waste results in a watery liquid and a pressable pulp which are easily separable by filtration or by a screw press, for example. The chemical agents added neutralize the acids and consequently there is no tendency to form undesirable products to interfere with the drying step. The objectionable flavoring constituents of the citrus material, for example naringin, form soluble compounds which are eliminated from (or materially reduced in) the desired product or new compounds may form which have desirable properties.

In accordance with the process of this invention the material is preferably ground to any size that will result in a desirable finished product. It is to be understood, however, that grinding or pulping is not necessary to all embodiments of the invention. The citrus material, for example, may be treated in the form and condition directly resulting from the canning operations; but for mechanical reasons it is well to disintegrate the material into small pieces.

The best results are obtained and the cost of handling reduced by adding liquids to the crushed mass of peel, rag and seed prior to, or during the chemical treatment. Sufficient liquids should be added until it is a freely flowing mass, thin enough to be handled by a centrifugal pump. This surplus liquid assists in the removal of the undesirable constituents and the resulting dried product is whiter and more palatable than that which has been treated with a minimum water content. The added liquid may be the liquor or filtrate from the pressing operation described below. By recycling this liquor valuable salts and/or sugars and/or syrups may be recovered economically when the concentration builds up.

In a typical plant operation the halved or quartered pieces of peel, together with the rag and seed, from the cannery are crushed, ground or shredded. The disintegrated mass falls into a mixing conveyor where water or recycle liquor and a controlled amount of the selected treating agents is added to the slimy fluid mass. The citrus mass passes through the mixing conveyor, and in which it is agitated, in from about three to about five minutes during which time the physical properties of the mass have changed to a watery liquid phase and a solid pulp. The processed citrus material is then dehydrated mechanically, for example, by a screw press, and the press or filter cake is subsequently dried and bagged, or it may be fed to cattle without further treatment. The process is continuous and no trained technician or chemist is necessary to control the operation. This operation also lends itself to a great saving in that the press cake can be transported economically many miles to a central drying plant since the weight is materially reduced and the keeping qualities are much greater than that of the untreated pulp.

The liquor which is extracted may be disposed of in a number of ways. I find it desirable to recycle a portion of the liquid as a diluent for the citrus material as described above. Obviously all the separated liquid cannot be utilized in the process and, therefore, the balance can be treated for the recovery of the valuable salts or sugars removed from the citrus material or added during the processing, or it may be inoculated with yeast or other fungi to produce alcohol, lactic acid or other valuable materials.

Naringin having the empirical formula $$C_{27}H_{32}O_{14}.2H_2O$$

is a glucoside giving the characteristic bitter taste to certain citrus fruits. This substance comprises from about .5% to about 1.5% of citrus waste prepared from relatively mature fruit. It is very soluble in hot water but only to the extent of about 1 part in 2,000 parts at 20° C. At 83° C. (the melting point of naringin) about 700 parts dissolve in 2,000. Nevertheless, the bitterness of naringin can be detected when in very dilute concentrations and a water solution containing one part in 10,000 has a distinct bitter taste.

Naringin yields upon hydrolysis in a dilute acid, glucose, rhamnose and naringenin. This latter compound may resolve into phloroglucin and an acid upon treatment with an alkali.

I have found that when the citrus mass is made alkaline by the addition of my chemical treating agent, the essential oils are broken down and the bitter tasting ingredients therein form sweet tasting soluble gels. It is my theory, which I advance purely by way of explanation and not by way of limitation on my process for I do not deem myself bound by this or any theory, that the bitter flavor found in the peel, seed and rag of citrus fruits is caused by the presence of the glucosides and their derivatives including naringin, naringenin, and hesperetin and possibly some homologs thereof. When either of these two latter compounds is treated with an alkaline material such as, for example, sodium hydroxide, the compound is resolved into phloroglucin and an acid. Phloroglucin has a sweetish taste and is readily soluble in water. The naringin is believed to form a number of unstable compounds or complexes, varying in viscosity, color, and taste. In alkaline solutions these substances occur as non-bitter gels and revert to a liquid under acid conditions.

In carrying out the process of my invention when my alkaline treating agent, comprising a mild alkali and a non-toxic compound of metals of group II of the periodic system, such as a calcium or magnesium compound, is added to the citrus waste, not only are the free acids existing in the waste neutralized but the alkaline material, according to my theory, resolves the naringin and hesperetin into phloroglucin and an acid. I believe, in accordance with my theory, that the alkalinity of the solution continues to exert its influence until all the naringin and hesperetin have been chemically broken down. Unless too much alkali has been added initially, the solution will eventually become mildly acidic because of the acids liberated during the decomposition of the glucosides.

The above theory seems to find support when my process is carried out. The citrus mass undergoing treatment is alkaline in reaction immediately after the addition of the mild alkali and the non-toxic group II metal compound. As the mixing proceeds on the mixing conveyor and with the aid of the agitation thereof, the mass becomes progressively more acid. This, I believe, is due to the residual acids liberated in the reaction and to such acids as were originally present in the citrus mass and not per se neutralized by the controlled amount of my treating agent. In all cases at the beginning of the reaction and when the mass is alkaline, the non-bitter gel forms, and in most cases reverts to a thin odorless liquid before the reaction is completed. In the relatively few instances when the reversion to the odorless liquid was not experienced, this reversion can readily be caused by the addition of small amounts of a weak acid such as, for example, weak citric acid or recycled liquor from some step in the cannery when that liquor was known to contain a weak acid. The ultimate product from the mixing conveyor was not the gel originally present but a two-phase reaction product. One of the phases was a watery liquid and the second phase, a pulpy solid easily separated from the liquid and characterized by almost complete absence of the customary bitter taste of the prior art pulp; a further characteristic of the pulpy solid was a mild and pleasant fruity odor which does not change to the repugnant and bitter product of the prior art pulps either on storage or in shipment.

In accordance with my theory explained above, I have approached the reaction with a view toward determining whether or not the reaction is purely chemical on the one hand or is a reaction which is fostered by enzyme action. As a result of my experiments, I am convinced that the reaction is not enzymic. I have separately processed, in accordance with my invention, separate batches of citrus waste consisting of ground peel, rag and seed, which were treated as follows to destroy the enzyme pectase. One of these batches was processed after freezing and while the citrus waste was maintained at about 34° F. A second lot of citrus waste was boiled for five minutes and subsequently processed. A third lot was treated with sulfurous acid and maintained in this acid condition for two weeks at room temperature and then processed at room temperature. In each instance results similar to those obtained with non-treated waste were obtained. From this I have concluded that the reaction is not enzymic.

While my invention consists in part in the treatment of citrus waste with a mild alkali and a non-toxic group II metal compound, I have found that under proper conditions, such as when calcium carbonate or calcium hydroxide is added, the requisite alkalinity and the requisite non-toxic group II metal content may be obtained through the use of a single chemical compound. It is necessary, however, to add sufficient of this compound or sufficient of the mixture of mild alkali and non-toxic group II metal material to insure alkalinity of the reaction at the commencement thereof. Stated briefly, my invention contemplates the treatment of citrus waste in a definitely alkaline solution preferably in the presence of a non-toxic group II metal compound, so as to foster the formation of a gel which is subsequently broken in an acid reaction medium. It is only when these steps are performed in the order which I have described above that the formation of the gel is coupled with the substantially complete removal or chemical conversion of the bitter constituent both in the original citrus waste and the resultant product.

Various chemical treating agents may be used but I have found the reagents should include a non-toxic group II metal compound such as a calcium or magnesium compound and a mild alkali. Non-toxic group II metal compounds including calcium and magnesium compounds, for example, the hydroxides, carbonates, and chlorides; compositions containing these compounds such as crushed oyster shell, powdered phosphate rock, powdered limestone, lime and chalk, give the desired results; either alone when the compound produces an alkaline solution or in combination when admixed with a mild alkali such as dilute aqueous ammonium hydroxide. A particularly useful combination is ammonium hydroxide and either calcium carbonate or hydroxide. These treating agents may be added in varying proportions but preferably from about .5% to about 5% by weight of the citrus waste to be treated.

A glucoside extract including pure naringin, which is the bitter flavor of the citrus material, was treated by this process. Naringin is practically insoluble in cold water and forms a white suspension when agitated. The suspension was made alkaline by the addition of a mild alkali such as a dilute aqueous ammonium hydroxide solution and the white suspended naringin changed to a light gel ranging in color from light brown to yellow-red. This gel had no trace of the bitter flavor. A weak solution of calcium chloride was added and made the gel much firmer. Upon the addition of citric acid to the pure gel the color changed to a very light greenish-yellow and the gel broke to a watery liquid of no apparent odor. Other alkali, such as potassium hydroxide and sodium hydroxide, were used. In all cases the non-bitter gel formed and reverted to the thin odorless liquid when the solution became acid.

The following examples illustrate the treatment of the crushed peel, rag and seed of normal grapefruit in accordance with this invention. In each instance the natural color of the crushed mass is greenish-yellow; the operation is at seasonal temperature; and the moisture content is about 80% to 85%.

*Example 1*

About .5% by weight of calcium hydroxide was added to the slimy crushed citrus waste, and while the mixture was being agitated the color turned to a light brown, and the viscosity of the liquid increased. In about five minutes the material separated into a greenish-yellow thin liquid and a white pulp. The slimy properties had disappeared, the solids set firmly, and the liquor was easily pressed from the pulp. The pressed solids were spongy, white and had a pleasant odor and taste with but little trace of bitterness. Upon drying this material, a bulky, palatable food of high absorbency was produced.

*Example 2*

About 1% calcium carbonate by weight was added to the fresh green citrus material and processed as in Example 1. In ten to fifteen minutes the reaction was complete. The product was a palatable, white food similar to that obtained in Example 1.

*Example 3*

To a mixture of calcium carbonate and green citrus material, as described in Example 2, was added a small amount of weak solution of ammonia (the amount necessary was that required to change the color of the liquids to a light brown). The results and products obtained were similar to those obtained in Example 2 but the time required for completion of the process was reduced to about two minutes.

*Example 4*

The unprocessed citrus material as used in Example 1 was treated with an excess of calcium hydroxide and the whole mass became a brilliant yellow and had a peculiar, disagreeable odor. The solids hardened to a yellow, brittle mass. The liquids were of high viscosity. To this over-neutralized batch was added enough citric acid to make the solution acidic and a clear greenish-yellow watery liquid (which was readily removed by filtering) separated from the mass. The yellow solids became whiter, of pleasant odor but retained their brittleness after drying and crumbled to a meal.

*Example 5*

Dilute sodium hydroxide was added to the green citrus waste until the color changed to yellowishred and the viscosity increased. The resulting product could not be successfully pressed in this condition as the liquids were of a syrupy nature. The mass was reacidulated by adding citric acid and the mass quickly changed to a yellowish-green, thin liquid and white solids. The liquid could now be easily squeezed out. Water from the lye tanks in the canning plants, which usually contains a weak alkaline solution of potassium or sodium hydroxide and wash waters from the packing tables, which contain citric acid in the form of waste juices, can be used as the alkali and acid in this example.

A weak solution of calcium chloride added to the above, either before or after reacidulation, adds to the pressing qualities but is not necessary. Other calcium compounds such as dicalcium phosphate or calcium sulphate have been found to react similarly to calcium chloride in this process.

The addition of the controlled varying amounts of alkaline material, a portion at least comprising an hydroxide, to the citrus waste material forms a transient gel of a desirable different color which is stable for only a short duration of time, specifically a matter of minutes, and therefore one that may be characterized as a minutes-stable transient gel. The free acids of the waste are apparently neutralized and the residual citric acids, which are quickly released, produce an acidic medium which breaks the gel to a colored watery mother liquor and lighter colored or whitish pulpy solids. As stated above in the several practical examples, the transient gel is stable for a matter of minutes as distinguished from hours, the duration of stability varying somewhat depending upon the particular reagent employed, but usually being complete in about 15 minutes.

When the citrus waste has been overneutralized by the use of an excess amount of hydroxide a gel of undesirable color and odor is produced, which is not transient, and may subsequently be broken into a water mother liquor and separable lighter colored solids by the addition of a sufficient amount of an acid to make the mass acidic.

It is the practice in some canning plants to run the whole fruit through a steeping tank of hot water, which swells the skin so it may be easily removed from the fruit. The peeled fruit is then run through a tank of lye which removes the coating next to the sections. It has been found that when the prepared alkali and calcium or magnesium compound are added to the water in the steeping tank, the peel coming from the fruit after it has left the steeping tank may be pressed and dewatered successfully when treated in accordance with my invention.

Under my process of chemically treating the green cannery by-products, the citrus materials may be dried on any commercial drier since the undesirable or potentially undesirable physical properties of the green peel, rag and seed have been dissipated by the chemical processing. If desired, the liquid-solid separation and drying operations may be simultaneous as by passing the material between heated rolls.

In another modification of my process, the citrus fruit peel and rag are processed as set forth above and the spongy solid subjected to repeated washings and ground after drying. This results in a food product having no flavor whatever which can be used as a base for breakfast food, pie fillings, jellies, jams, etc.

From the above it will be apparent that a new process for the production of a new foodstuff is provided by this invention wherein citrus waste materials, usually comprising peel, rag and seed may be chemically treated to remove bitterness thus making the foodstuff palatable and readily dehydrated.

While the invention has been described in detail and a number of examples shown, it is to be understood that the invention is not limited to these particular examples and all such changes and modifications as come within the scope of the claims are embraced thereby.

This application is a continuation-in-part of my earlier co-pending applications Serial No. 61,085, filed January 27, 1936, and Serial No. 136,016, filed April 9, 1937.

The invention having been set forth, what I claim as new and useful is:

1. The method of preparing a substantially non-bitter and edible product from citrus waste material which includes the steps of adding to the material controlled varying amounts of non-toxic alkaline compound comprising at least in part an hydroxide to form a differently colored minutes-stable transient gel, breaking the said gel in the presence of an acidic medium to form a colored watery mother liquor and lighter colored pulpy solids, and separating said solids and the mother liquor.

2. The method of preparing a substantially non-bitter and edible product from citrus waste material, which includes the steps comprising subjecting the citrus material to a shredding operation, treating the material with controlled varying amounts of a non-toxic alkaline material comprising at least in part an hydroxide to form a brown colored minutes-stable transient, syrupy gel and breaking the said gel in the presence of an acidic medium to form a light brown watery mother liquor and readily separable whitish pulpy solids.

3. The method of preparing a dry, substantially non-bitter and edible product from citrus waste material which includes subjecting the citrus material to a shredding operation, adding to the said shredded material sufficient water to make a freely flowing mass, adding to the said mass controlled varying amounts of a non-toxic alkaline material comprising at least in part an hydroxide thereby forming a substantially dark colored minutes-stable neutral gel, breaking the gel in the presence of an acidic medium to form a brownish watery mother liquor and lighter-colored pulpy solids, separating said solids and mother liquor, and drying the said solids.

4. In the method of preparing a substantially non-bitter and edible product from citrus waste material, the steps of subjecting the citrus fruit material to a shredding operation, adding sufficient water to the shredded material to make a freely flowing mass, adding to the mass controlled amounts of ammonia and a non-toxic alkaline earth metal compound thereby forming an overneutralized gel, breaking the gel thus formed by the addition of a weak acid to form a watery mother liquor and a suspension of pulpy solids, and separating said solids and the said liquor.

5. In the method of preparing a naringin-free and edible product from citrus waste material which includes the steps of subjecting the citrus material to a shredding operation, adding to the shredded material sufficient water to make a freely flowing mass, forming a brown colored minutes-stable gel by adding to the mass calcium hydroxide in quantities sufficient to render the mass substantially neutral and hydrolize the naringin, breaking the gel with citric acid in quantities sufficient to render the mass slightly acid, thus forming a light colored watery mother liquor and whitish pulpy solids.

6. In the method of preparing a substantially non-bitter and edible product from citrus waste material, the steps comprising treating the said material with controlled amounts of an aqueous solution of ammonia thereby forming an over-neutralized gel, breaking the gel by the addition of a weak acid to form a watery mother liquor and a suspension of pulpy solids, and separating said solids from the said liquor.

7. The method of preparing a substantially non-bitter and edible product from citrus waste material which includes the steps of adding to the material controlled varying amounts of a non-toxic alkaline earth metal hydroxide to neutralize the free citric acids of the waste as evidenced by the formation of a brown colored minutes-stable transient gel, breaking the said gel in the presence of an acidic medium provided by the residual acids of the waste to form a light brown watery mother liquor and lighter colored pulpy solids, and separating said solids and mother liquor.

8. The method of preparing a substantially non-bitter and edible product from a grapefruit waste material which includes the steps of adding to the material controlled variable amounts of a non-toxic alkaline hydroxide to neutralize the free citrus acids of the waste as evidenced by the formation of a brown colored minutes-stable transient gel, breaking the said gel in the presence of an acidic medium provided by the liberated residual acids to form a watery mother liquor and lighter colored pulpy solids, and separating the said solids and the mother liquor.

9. The method of preparing a substantially non-bitter and edible product from citrus waste material which includes the steps of adding to the material controlled varying amounts of a non-toxic alkaline earth metal hydroxide, which in the presence of water produces an alkaline solution to neutralize the free citric acids of the waste as evidenced by the formation of a brown colored minutes-stable transient gel, mixing and agitating the jelled citrus mass to liberate the residual citric acids and provide an acidic medium, breaking the said gel in the presence of said acidic medium to form a thin watery mother liquor and light colored pulpy solids, and separating said solids and the mother liquor.

10. The method of preparing a substantially non-bitter and edible product from citrus waste material which includes the steps of adding to the material controlled varying amounts of a non-toxic alkaline earth metal compound from the group consisting of hydroxides of calcium and magnesium, to form a brown colored minutes-stable transient gel, breaking the said gel in approximately 15 minutes in the presence of an acidic medium to form a watery mother liquor and whitish pulpy solids, and separating said solids and the mother liquor.

11. The method of preparing a substantially non-bitter and edible product from citrus waste material which includes the steps of adding to the material controlled varying amounts of a mildly alkaline compound and a non-toxic alkaline earth metal hydroxide to form a brown colored minutes-stable transient gel, breaking the said gel in the presence of an acidic medium to form a watery mother liquor and whitish pulpy solids, and separating said solids and the mother liquor.

12. In the method of preparing a naringin-free and edible product from citrus waste material the steps of subjecting the citrus material to a shredding operation, adding to the shredded material sufficient water to make a freely flowing mass, forming a minutes-stable gel by adding to the mass calcium hydroxide in varying quantities sufficient to change the color of the waste material to render the mass substantially neutral and hydrolyze the naringin, breaking the gel with an acidic medium, thus forming a watery mother liquor and pulpy solids.

13. The method of preparing a substantially non-bitter and edible product from citrus waste material which includes the steps of adding to the material controlled varying amounts of a non-toxic alkali metal compound, which in the presence of water produces an alkaline solution, to form a brown colored minutes-stable transient gel, breaking the said gel in the presence of an acidic medium to form a watery mother liquor and light colored pulpy solids, and separating said solids and the mother liquor.

14. The method of preparing a substantially non-bitter and edible product from citrus waste material which includes the steps of adding to the material controlled varying amounts of a non-toxic alkali metal hydroxide, which in the presence of water produces an alkaline solution, to form a brown colored minutes-stable transient gel, quickly breaking the said gel in the presence of an acidic medium to form a watery mother liquor and pulpy solids, and separating said solids and the mother liquor.

DANIEL BOSCAWEN VINCENT.